United States Patent
Howard

[19]

[11] Patent Number: 6,041,906
[45] Date of Patent: Mar. 28, 2000

[54] CONVEYOR CHUTE LINER

[75] Inventor: R. Scott Howard, Benton, Ky.

[73] Assignee: Arch Environmental Equipment Inc., Paducah, Ky.

[21] Appl. No.: 09/023,067

[22] Filed: Feb. 13, 1998

[51] Int. Cl.[7] .................................................. B65G 11/00
[52] U.S. Cl. ........................................................ 193/2 R
[58] Field of Search ............................ 193/2 R, 4, 25 E, 193/3

[56] References Cited

U.S. PATENT DOCUMENTS

| | | | |
|---|---|---|---|
| 2,174,716 | 10/1939 | Bethell | 472/90 |
| 2,311,501 | 2/1943 | Zoldok . | |
| 4,040,530 | 8/1977 | Mahr et al. | 193/2 R X |
| 4,054,194 | 10/1977 | Davis | 193/2 R X |
| 4,547,985 | 10/1985 | Silins et al. | 193/2 R X |
| 4,645,055 | 2/1987 | Griese et al. | 193/2 R |
| 5,055,336 | 10/1991 | Davis | 193/2 R X |
| 5,109,970 | 5/1992 | Zaborszki | 193/2 R |
| 5,184,706 | 2/1993 | Christenson | 193/2 R |
| 5,480,018 | 1/1996 | Sasaki | 193/2 R |

*Primary Examiner*—James R. Bidwell
*Attorney, Agent, or Firm*—Lloyd L. Zickert

[57] ABSTRACT

A chute liner for an impact surface in a chute of a conveyor bearing granular coal, aggregate, or other granular material which is within a given granule size range. The chute has at least one impact surface against which the granular material impacts when the material is input to or discharged from the conveyor; usually, there are plural impact surfaces in the chute. The chute liner includes a base plate of molded elastomer conforming to and mounted on the impact surface of the chute. A multiplicity of elastomer knobs are molded integrally with the base plate and project toward the interior of the chute when the liner is mounted on the chute impact surface. The knobs are of truncated conical configuration and are effectively spaced from each other by distances greater than the size of the smaller granules of the granular material, so that granular material accumulates between the knobs to afford a renewable wear surface within the chute. Fasteners are provided for mounting the chute liner in the conveyor chute with the base of the liner covering at least a portion of the inner impact surface of the chute.

10 Claims, 2 Drawing Sheets

CONVEYOR CHUTE LINER

BACKGROUND OF THE INVENTION

In many industrial installations, including coal mines, power stations, concrete mixing plants, and many others, it is necessary or desirable to move appreciable quantities of granular material from one location to another. For example, in a coal mine quantities of granular coal may need to be moved, often in two or more steps, from a mine face to a storage location for subsequent shipment to a coal consumer. In a power station utilizing granular coal for fuel, the coal is often initially stored at a site separate from the power generating installation and is subsequently delivered to that installation as needed. Similarly, the ash or other waste product produced by burning of the coal may require removal from the power generation facility to yet another separate location. In a concrete mixing plant a granular stone aggregate may be initially stored at a location remote from the mixing plant; in such an installation, the aggregate may be moved to the mixing plant when it is needed.

In these and many other industrial facilities a conveyor, usually a belt conveyor, is employed to transport the granular material (.e.g., coal, granular stone aggregate, etc.) to or from the location at which it is utilized. Most such conveyors have an input chute for delivering the granular material to the conveyor and a discharge chute for discharge of the granular material at the output end of the conveyor. In either case, the chute often includes one or more impact surfaces on which the granular material impinges. Those impact surfaces are often subject to appreciable abrasion from the granular material, and hence present a continuing requirement for repair and/or replacement of the chute.

Prior proposals directed toward amelioration or correction of these and similar abrasion problems have included corrugations, formed in sheet metal or metal plates, to guide movement of the granular material. Multiple short knobs of molded metal have also been suggested. But prior proposals addressing this difficulty have generally been unduly expensive or have not fully met the abrasion problems presented.

SUMMARY OF THE INVENTION

It is a primary object of the present invention, therefore, to provide a new and improved chute liner for an impact surface of a conveyor chute, input or output, that is simple and inexpensive to manufacture and to install in a conveyor chute, which chute liner is effective to minimize or even eliminate the problem of abrasion from conveyance of a granular material.

It is a further object of the invention to provide a new and improved conveyor chute liner for a granular material conveyor that utilizes the granular material itself in reducing wear on a conveyor chute.

Accordingly, the invention relates to a chute liner for an impact surface of an input chute or discharge chute for a conveyor bearing granular coal, aggregate, or other granular material within a given granular size range, the chute having at least one impact surface against which the granular material impacts when the material is input to or discharged from the conveyor. The chute liner includes a base plate of molded elastomer having a base portion conforming to the impact surface of the chute. A multiplicity of elastomer knobs are molded integrally with the base plate; they project toward the interior of the chute when the liner is mounted on the impact surface of the chute. The knobs are of truncated conical configuration and are spaced from each other by distances greater than the size of the of the smaller granules of the granular material so that some of the granular material accumulates between the knobs to afford a renewable wear surface within the discharge chute. There are also means for mounting the chute liner in a conveyor chute, with the base of the liner covering at least a portion of the inner impact surface of the chute.

DESCRIPTION OF A PREFERRED EMBODIMENT

Figure 1:
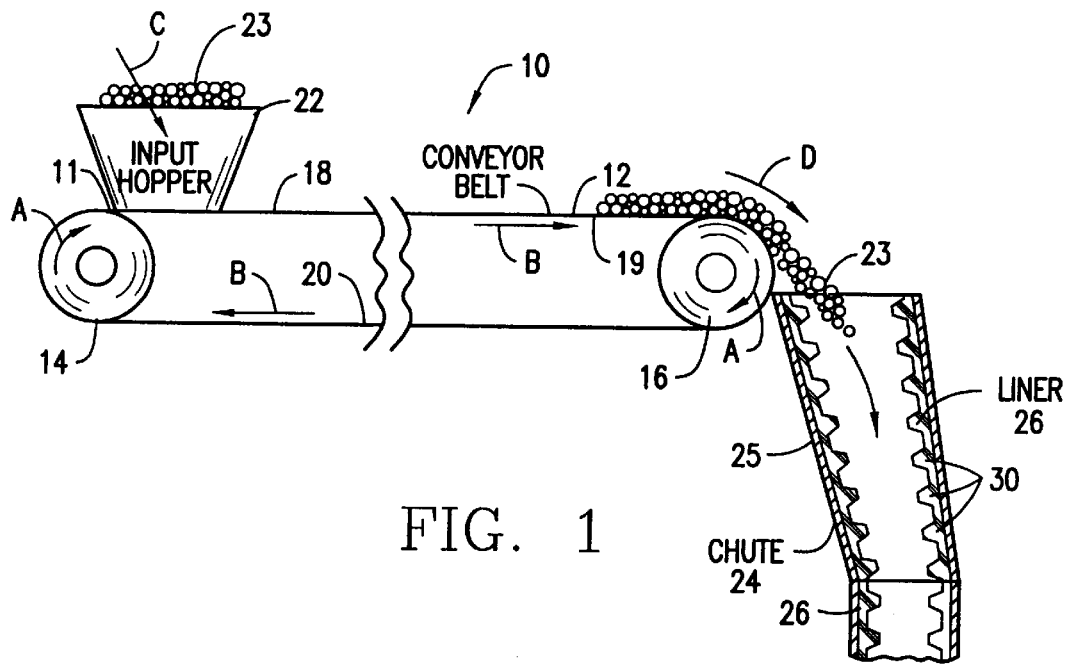
FIG. 1 is a schematic side elevation view of a typical belt conveyor for granular material.

FIG. 1 affords a schematic illustration of a conveyor system 10 having an input end 11 and an output or discharge end 12. At the input end 11 there is a pulley 14; the output end includes a discharge pulley 16. Either of the two pulleys 14 and 16 may be driven, the direction of rotation of the pulleys being indicated by the arrows A. A conveyor belt 18 having a material-bearing run 19 and a return run 20 engages both of the pulleys; the belt moves in the direction indicated by the arrows B. The length of the conveyor is determined by the needs of the user; only the input and output ends of the pulley have been shown.

At the input end of conveyor system 10 there is an input chute 22 into which granular material 23 is fed in the direction indicated by the arrow C. At the output or discharge end of conveyor system 10 there is a discharge chute 24 into which the granular material 23 is discharged from belt 18 to be fed to a storage pile or other like destination. The direction of movement of the granular material 23 from conveyor belt 18 (actually from the material-bearing run 19 of the belt) into discharge chute 24 is indicated by arrow D. Chute 24 is shown as having at least one impact surface 25 against which the granular material 23 impinges as it enters the chute. In actual fact there may be a plurality of such impact surfaces 25. It is these impact surfaces 25 that are worn or even destroyed by abrasion from granular material 23. A liner 26 is shown on the impact surface in the discharge chute 24 of conveyor system 10. The input chute 22 of the conveyor belt system would also include at least one impact surface against which the material 23 impinges.

Figure 2:
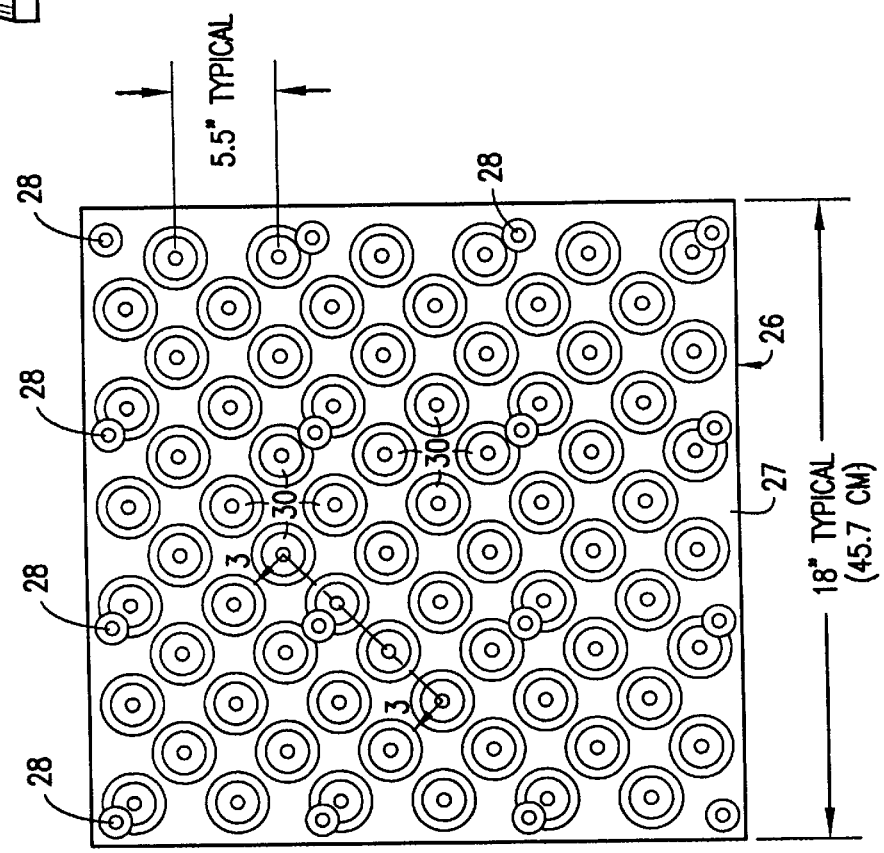
FIG. 2 is a plan view of a chute liner for the conveyor shown in FIG. 1.

The construction and operation of one embodiment of the chute liner 26, which liner constitutes the subject of the present invention, can best be understood by reference to FIGS. 2–5. As best shown in FIG. 2, chute liner 26 includes a base plate 27. Base plate 27 may be of rectangular configuration, assuming that is the configuration required for an impact surface within the conveyor chute in which the chute liner is to be mounted. Other configurations for the base plate may be employed if desired or if required. Base plate 27 is molded with a plurality of bolt apertures 28 so that it can be readily mounted upon a chute impact surface. The base plate 27 of chute liner 26, as illustrated, may have a thickness of about 0.5 inch (1.27 cm). The dimensions shown in FIG. 2 are exemplary of the preferred embodiment; they are subject to change. The preferred elastomer for plate 27 of chute liner 26 is polyurethane, but other elastomers or resins may be utilized as desired. Preferably, polyurethane with a Shore A hardness in a range of 80 to 90 is used.

Chute liner 26 further includes a multiplicity of elastomer knobs 30. Knobs 30 are molded integrally with base plate 27 and project inwardly toward the interior of the conveyor chute when the chute liner is mounted on the impact surface of the chute, such as surface 25 in discharge chute 24 (FIG. 1). In the rectangular chute liner 26 illustrated in FIG. 2, there are a total of seventy-two knobs, but that number is not critical; it depends upon the size of the knobs and the displacement between knobs.

Figure 3:
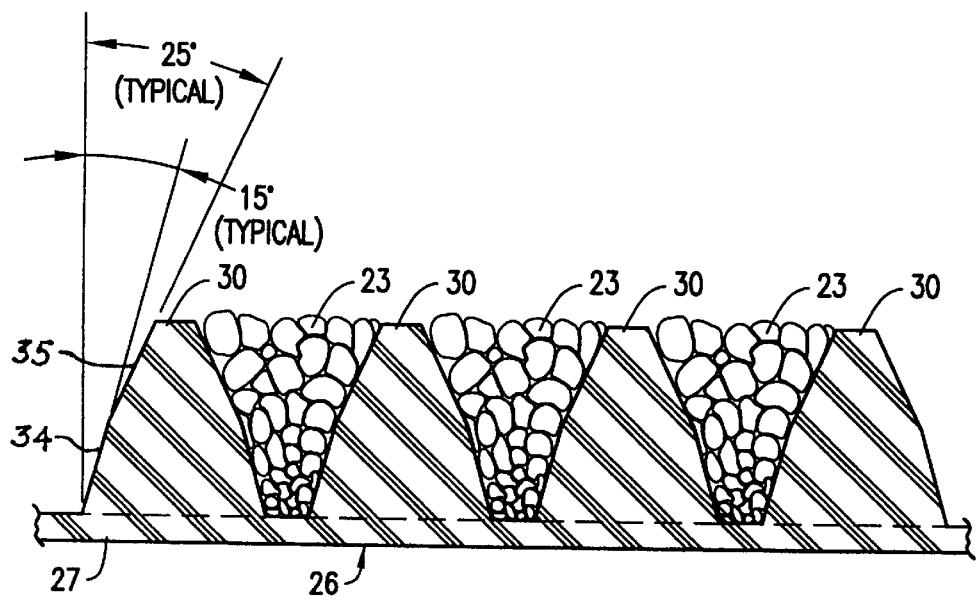
FIG. 3 is a sectional elevation view, on an enlarged scale, of a portion of the chute liner of FIG. 2, taken approximately along line 3—3 therein.
Figure 4:
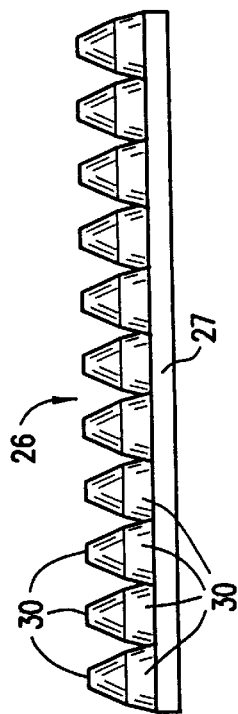
FIG. 4 is an end elevation view of the chute liner of FIGS. 1 and 2.
Figure 5:
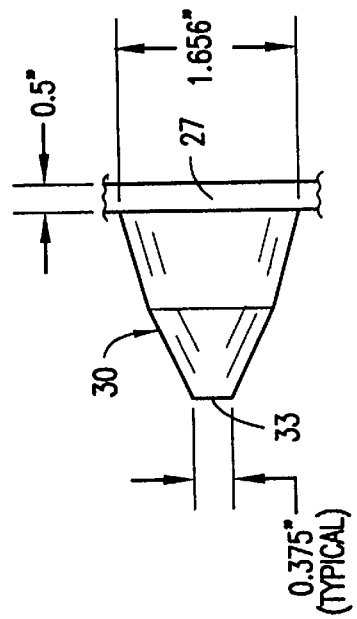
FIG. 5 is a detail view illustrating the knob construction employed in the chute liner of the embodiment of the invention shown in FIGS. 1–4.

Each of the multiplicity of elastomer knobs 30 is molded integrally with the impact plate 27 of chute liner 26, as best shown in FIGS. 3 and 5. Knobs 30 project toward the interior of the chute in which liner 26 is mounted when liner 26 is mounted on the impact surface of the chute; see FIG. 1. Knobs 30 are each of truncated conical configuration having a wide base of approximately 1.656 inch (4.2 cm) and an end surface 33 of approximately 0.375 inch (1 cm) as shown in the detail view, FIG. 5. Actually, in the specific chute liner construction shown in the drawings, knobs 30 are of dual tapered configuration, each having a base portion 34 with a taper of 15° and an end portion 35 with a taper of approximately 25°. Knobs 30 are spaced from each other by distances somewhat greater than the size of the smallest granules of the granular material 23 (FIG. 1) so that granular material 23 accumulates between the knobs as shown in FIG. 3 to afford a renewable wear surface within the discharge chute in which chute liner 26 is mounted.

In operation, chute liner 26 collects granular material 23 between knobs 30 as best shown in FIG. 3. It can be readily seen that the accumulation of granular material between the knobs affords the desired renewal wear surface along the tops of the chute liner knobs and effectively protects the impact surface of the chute itself from abrasion due to the impingement of the granular material. Of course, the chute liner should be mounted closely in conformity to the impact surface within the chute; this is made possible by the many mounting openings 28 in the chute liner (see FIG. 2).

From the foregoing description of the preferred embodiment it will be apparent that the chute liner of the invention is simple and inexpensive to manufacture. Installation in a conveyor chute is also simple and inexpensive, utilizing the integral mounting apertures 28 (FIG. 2). The chute liner effectively eliminates or at least minimizes the problem of abrasion, in part because a part of the granular material itself (e.g., coal, stone aggregate, ash, etc.) serves as a buffer for the impact surface or surfaces in a conveyor chute. It will be recognized that the knob height is subject to appreciable variation, as from one inch to three inches. Knob spacing may be varied in accordance with the size of the granules in the material being conveyed. The dimensions shown in the drawings, particularly FIGS. 2 and 5, are typical but not critical.

I claim:

1. A chute liner for an impact surface of an input chute or discharge chute for a conveyer bearing granular coal, aggregate, or other granular material within a given granular size range, the chute having at least one impact surface against which the granular material impacts when the material is input to or discharged from the conveyor, the chute liner comprising:

an impact base plate of molded elastomer having a base portion conforming to the impact surface of the chute;

a multiplicity of elastomer knobs, molded integrally with the base plate and projecting toward the interior of the chute when the liner is mounted on the impact surface of the chute, the knobs each being of truncated conical configuration and effectively spaced from each other by distances greater than the size of the smaller granules of the granular material so that some of the granular material accumulates between the knobs to afford a renewable wear surface within the discharge chute;

and means for mounting the chute liner in a conveyor chute, with the base portion of the liner covering at least a portion of the impact surface of the chute.

2. A chute liner for an impact surface of a conveyor, as set forth in claim 1, in which the elastomer from which the chute liner base plate and knobs are molded is polyurethane.

3. A chute liner for an impact surface of a conveyor, as set forth in claim 1, in which the elastomer from which the chute liner is molded has a hardness of 80 to 90, on the Shore A scale.

4. A chute liner for an impact surface of a conveyor, as set forth in claim 1, in which the base plate of the chute liner is about 0.5 inch (1.27 cm) thick and the knobs have a height of about 1.0 inch (2.54 cm) to 3.0 inches (7.5 cm).

5. A chute liner for an impact surface of a conveyor as set forth in claim 1, wherein the knobs are equally spaced apart.

6. A chute liner for an impact surface of a conveyor as set forth in claim 1, wherein the knobs are arranged in staggered relation to each other.

7. A chute liner for an impact surface of a conveyor as set forth in claim 1, wherein the knobs are of a double truncated conical configuration.

8. A chute liner for an impact surface of a conveyor as set forth in claim 1, wherein the knobs are equally spaced apart and arranged in staggered relation to each other.

9. A chute liner for an impact surface of a conveyor as set forth in claim 8, wherein the knobs are of a dual tapered configuration.

10. A chute liner for an impact surface of a conveyor as set forth in claim 9, wherein the knobs include a base portion having a taper of about 15 degrees and an end portion having a taper of about 25 degrees.

* * * * *